United States Patent
Rocca

(10) Patent No.: US 7,370,478 B2
(45) Date of Patent: May 13, 2008

(54) METHOD OF CONTROLLING A GAS COMBUSTOR OF A GAS TURBINE

(75) Inventor: Franco Rocca, Genoa (IT)

(73) Assignee: Ansaldo Energia S.p.A., Genoa (IT)

( * ) Notice: Subject to any disclaimer, the term of this patent is extended or adjusted under 35 U.S.C. 154(b) by 204 days.

(21) Appl. No.: 11/129,453

(22) Filed: May 13, 2005

(65) Prior Publication Data

US 2007/0033947 A1 Feb. 15, 2007

(30) Foreign Application Priority Data

May 13, 2004 (IT) .......................... TO2004A0309

(51) Int. Cl.
 *F02C 7/26* (2006.01)
 *F02C 9/26* (2006.01)
 *F23R 3/28* (2006.01)

(52) U.S. Cl. ............................ 60/776; 60/737; 60/748; 60/39.826

(58) Field of Classification Search .................. 60/737, 60/748, 39.826, 776
See application file for complete search history.

(56) References Cited

U.S. PATENT DOCUMENTS

| 4,701,124 A | 10/1987 | Maghon et al. |
| RE33,896 E * | 4/1992 | Maghon et al. ................ 60/748 |
| 5,344,310 A * | 9/1994 | Harbeck et al. ............. 431/158 |
| 5,451,160 A * | 9/1995 | Becker ........................ 431/183 |
| 5,899,074 A | 5/1999 | Komatsu et al. |
| 5,941,698 A | 8/1999 | Darling et al. |
| 6,079,976 A * | 6/2000 | Nishiyama et al. .......... 431/187 |
| 6,322,353 B1 | 11/2001 | Stalder et al. |
| 6,374,593 B1 * | 4/2002 | Ziegner ........................ 60/772 |
| 2001/0024774 A1 | 9/2001 | Berenbrink |

FOREIGN PATENT DOCUMENTS

EP 0809072 11/1997

OTHER PUBLICATIONS

Maghon, et al., Progress in $NO_x$ and CO Emission Reduction of Gas Turbines, The American Society of Mechanical Engineers, Symposia Series, New York, NY, Oct. 21, 1990, pp. 1-7.
European Search Report dated Jan. 19, 2006.

* cited by examiner

*Primary Examiner*—Ted Kim
(74) *Attorney, Agent, or Firm*—McCarter & English, LLP

(57) ABSTRACT

A gas combustor has a peripheral premix burner, and a central diffusion burner whose nozzle defines an eccentric first channel housing an ignition device, an axial second channel, and a third channel interposed radially between the first and second channel; the gas combustor is controlled, at a first start-up step, to keep the peripheral burner off and to feed a fuel gas stream along the third channel; at a second step, after a given load is exceeded, the peripheral burner is activated, and the gas stream in the central burner continues to be fed along the same channel as at the first step, and is regulated to reduce its flow to a value greater than zero.

3 Claims, 2 Drawing Sheets

METHOD OF CONTROLLING A GAS COMBUSTOR OF A GAS TURBINE

The present invention relates to a method of controlling a gas turbine gas combustor of the type comprising a combustion chamber, a peripheral main burner, and a central secondary burner. The peripheral main burner is a so-called "premix" type, i.e. receives a stream of fuel gas and a stream of air, which are mixed with a strong surplus of air with respect to the stoichiometric ratio) before being fed into the combustion chamber; while the central burner is a so-called "diffusion" type, i.e. feeds the fuel gas and air streams separately (with a practically stoichiometric ratio) into the combustion chamber, where mixing and combustion occur.

BACKGROUND OF THE INVENTION

As is known, a premix burner flame is characterized by lower temperature (1500° C. as compared with 2000° C. typical of a diffusion flame) and therefore lower nitric oxide emissions.

In known solutions, the central secondary burner comprises a nozzle extending along the axis of the gas combustor, and which supplies an air stream and two separate fuel gas streams: a first fuel gas stream is fed to the combustion chamber, where it mixes with the air to produce a diffusion flame when igniting and starting up the gas turbine; and, once the system exceeds a given power or load after start-up, the premix burner is activated, the central secondary burner feeds a second fuel gas stream into the combustion chamber to keep a pilot flame, for stabilizing the premix burner flame, alight, and the first fuel gas stream is cut off.

Known solutions as described above therefore call for conduits and valve assemblies by which to feed and control two separate fuel gas streams through the central secondary burner.

In the known gas combustor described above, forming and/or connecting the conduits upstream from the central secondary burner nozzle involve/s a good deal of time and money, and relatively complex systems are required to control the valve assemblies.

SUMMARY OF THE INVENTION

It is an object of the present invention to provide a method of controlling a gas turbine gas combustor, designed to provide a straightforward, low-cost solution to the aforementioned drawbacks, and which, preferably, provides for maintaining the gas combustor flame stable.

According to the present invention, there is provided a method of controlling a gas combustor of a gas turbine; the gas combustor having an axis and comprising:

a central diffusion burner comprising a nozzle extending along said axis and defining a first channel radially outwards with respect to said axis, conducting an air stream, and housing an ignition device; a second channel extending along said axis; and a third channel interposed radially between said first and said second channel and separate from said first and said second channel; and a peripheral premix burner surrounding said nozzle;

the method being characterized by comprising a first step of starting up said gas turbine, and wherein:

said peripheral premix burner is off;

a fuel gas stream is fed along said third channel; and part of said fuel gas stream is diverted from said third channel to said ignition device to ignite a diffusion flame at the start of said first step;

and by comprising, once a given power threshold is exceeded, a second step wherein:

said peripheral premix burner is on;

said fuel gas stream continues to be fed along said third channel; and said fuel gas stream is regulated to reduce gas flow at the start of said second step with respect to gas flow at said first step and to a value greater than zero.

According to the present invention, there is also provided a gas combustor of a gas turbine; the gas combustor having an axis and comprising:

a central diffusion burner comprising a nozzle extending along said axis and defining a first channel radially outwards with respect to said axis, conducting an air stream, and housing an ignition device; a second channel extending along said axis; and a third channel interposed radially between said first and said second channel and separate from said first and said second channel;

a peripheral premix burner surrounding said nozzle;

control means for keeping said peripheral premix burner off at a first step wherein said gas turbine is started up, and for activating said peripheral premix burner at a second step, once a given power threshold is exceeded; and feed means for feeding a fuel gas stream along said third channel;

and being characterized by also comprising:

regulating means for regulating said fuel gas stream to reduce gas flow at the start of said second step with respect to gas flow at said first step and to a value greater than zero along said third channel; and diverting means for diverting part of said fuel gas stream from said third channel to said ignition device, and for igniting a diffusion flame at the start of said first step.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
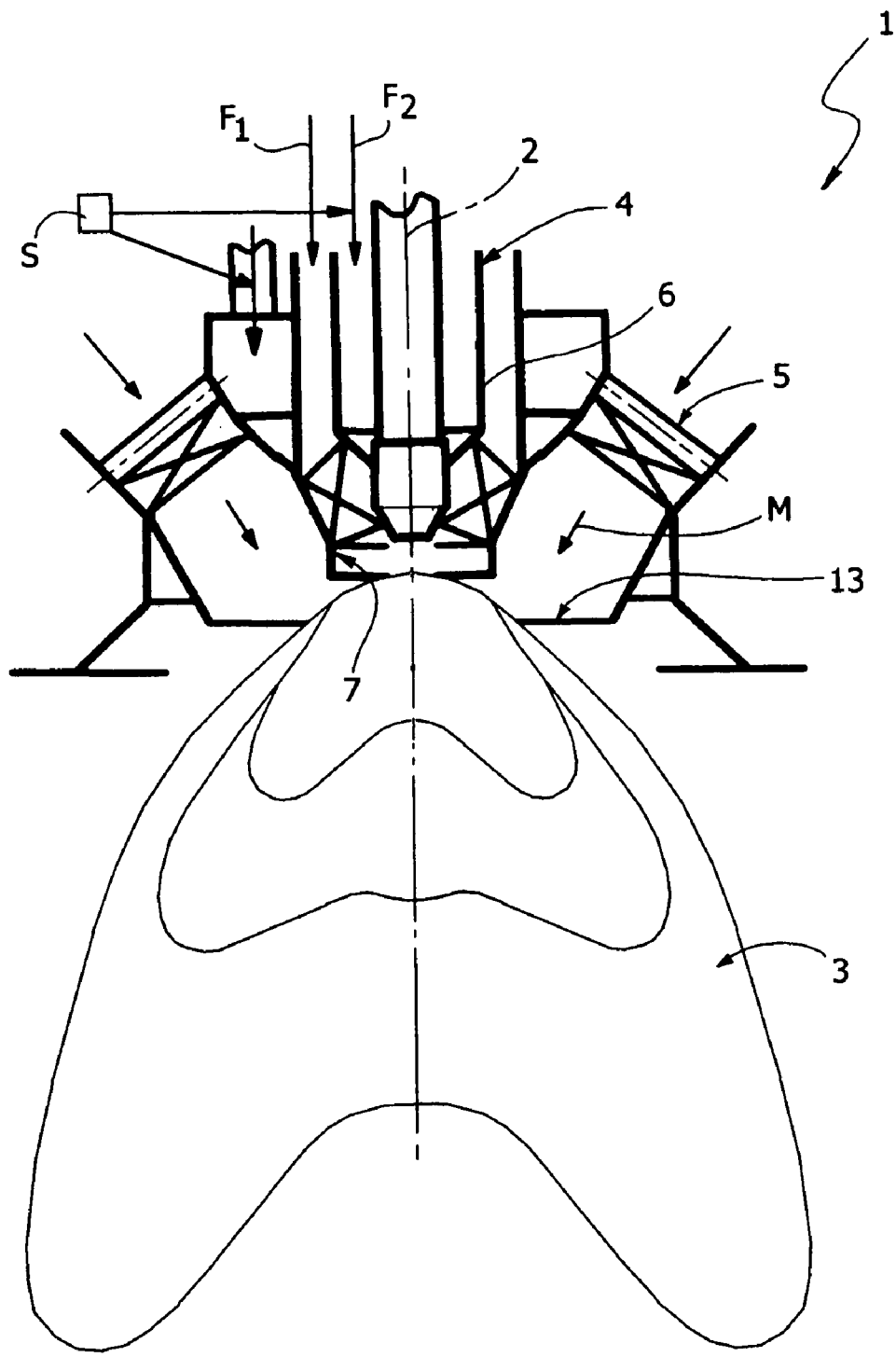
FIG. 1 shows a schematic diametrical section of the gas combustor controlled in accordance with the teachings of the present invention.

Number 1 in FIG. 1 indicates as a whole a gas combustor (shown partly and schematically) of a gas turbine.

Gas combustor 1 has an axis 2, and comprises a combustion chamber 3; a central diffusion burner 4; and a peripheral premix burner 5 surrounding burner 4.

Figure 2:
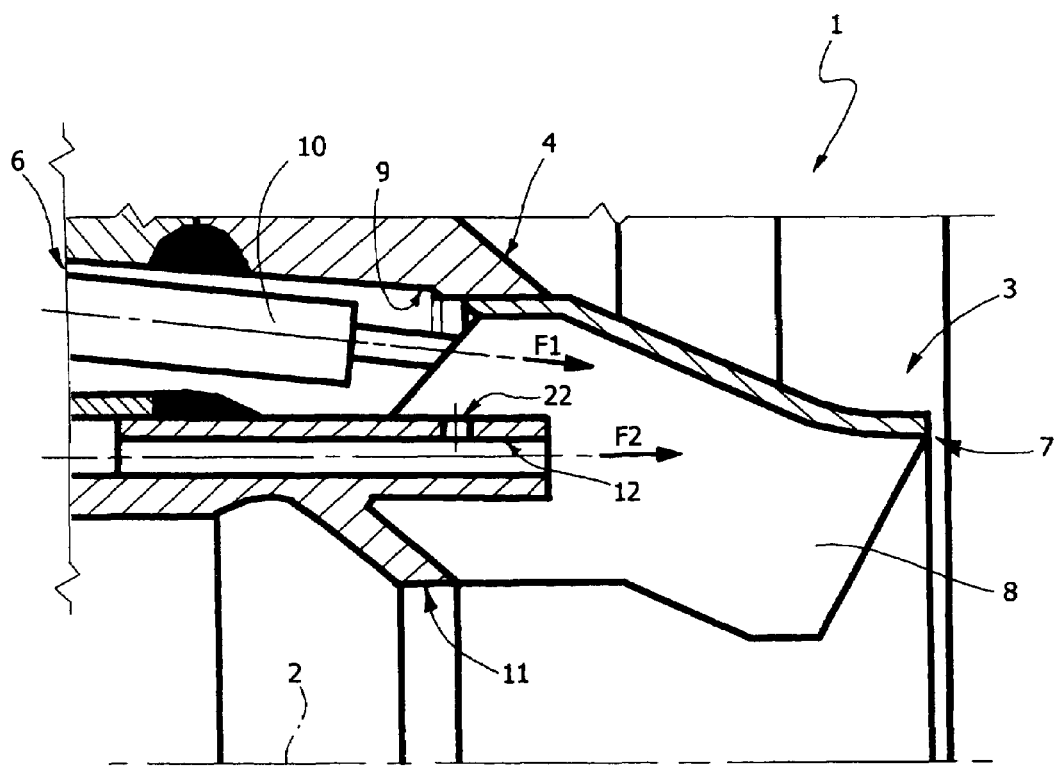
FIG. 2 shows a larger-scale section of a detail of the FIG. 1 gas combustor.

With reference to FIG. 2, burner 4 comprises an end nozzle 6 extending along axis 2 and having an axial outlet 7, which comes out inside chamber 3 and is fitted with vanes 8. Nozzle 6 defines a first channel 9 radially outwards with respect to axis 2 and housing a known ignition device 10; a second channel 11 extending along axis 2; and a third channel 12 interposed radially between and separate from channels 9 and 11.

As shown in FIG. 1, burner 5 has an outlet 13, which comes out inside chamber 3, surrounds outlet 7, and is also fitted with vanes to impart sufficient turbulence to a gas and air mixture M produced inside burner 5 from an incoming air stream and an incoming fuel gas stream, with an air quantity greater than the theoretical stoichiometric ratio.

Figure 3:
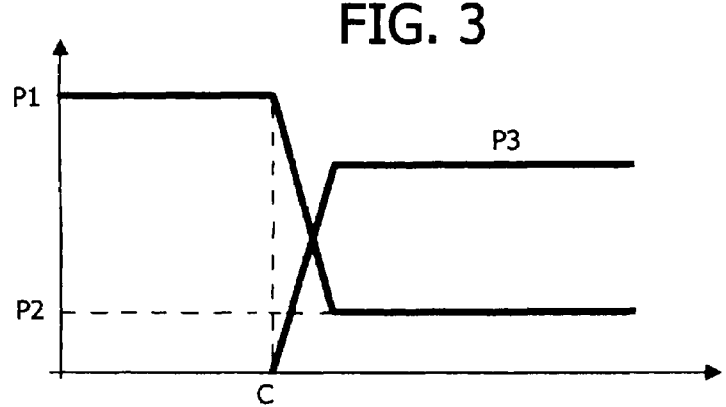
FIG. 3 shows a graph of the method of controlling the FIG. 1 gas combustor.

Supply of the incoming air and fuel gas streams to burner 5 is controlled by a control unit S (shown schematically), which keeps burner 5 off at a first step, in which the gas turbine is started up or charged, and activates burner 5 at a second step, following the first, when a given power or load threshold—indicated C in FIG. 3 and equal to about 10% of total rated power—is exceeded.

At the first and second step, an air stream F1 is fed into chamber 3 along channel 9; and a fuel gas stream F2 is fed along channel 12, and, as it flows out into chamber 3, mixes and reacts with stream F1 to produce a diffusion flame. Part of stream F2 is diverted to device 10 through a hole 22 formed through the outer lateral wall of channel 12 to connect channel 12 to channel 9. At the start of the first step, device 10 is controlled to produce a spark which, in the presence of the gas issuing from hole 22 and the air inside channel 9, therefore produces said diffusion flame.

Streams F1 and F2 are fed to nozzle 6 along respective conduits not described in detail, and are controlled by unit S. The operating parameters of unit S are set so as to feed fuel gas along channel 12 at both the first and second step, and to reduce flow of stream F2, once load threshold C is reached, i.e. at the start of the second step, from a constant flow value indicated P1 and set during the first step, to a value P2 greater than zero and equal to 5% of value P1 (FIG. 3). At the second step, a pilot flame is therefore produced to keep the premixed flame generated by burner 5 stable, and burner 5 is activated and controlled by unit S to increase incoming fuel gas flow from a zero value to a constant maximum value P3, as shown in the FIG. 3 graph.

In short, as opposed to a dedicated diffusion flame, ignition and charging are performed by the same flame, which functions as a pilot flame; and, once an appropriate load threshold C is reached, the pilot flame of burner 4 is reduced to nominal (by reducing fuel gas flow to value P2), and actual combustion is switched over to burner 5 to obtain the premixed flame. In other words, the gas turbine is accelerated by the pilot flame only, and the premixed flame is added to the pilot flame at the second step, when the set load threshold C is reached.

Combustor 1 therefore only requires two fuel gas feed lines—one each for the premix burner and pilot flame—as opposed to three (diffusion, pilot, premix) fuel lines, so that the conduits and valve assemblies for feeding and controlling fuel flow to burners 4, 5 are extremely straightforward.

By virtue of the above method, no conduits are required to feed fuel to channel 11, and/or channel 11 may be used for other purposes, e.g. for housing other components.

At the same time, dependability of the combustion process is relatively high, on account of the simplicity of the control logic circuits of unit S.

Moreover, the pilot flame produced by burner 4 is extremely stable, by virtue of stream F2 flowing along offset channel 12 and mixing perfectly with air stream F1 from channel 9, and also by virtue of vanes 8 producing turbulence at outlet 7.

Clearly, changes may be made to the method as described herein without, however, departing from the scope of the present invention.

The invention claimed is:

1. A method of controlling a gas combustor (1) of a gas turbine; the gas combustor having an axis (2) and comprising:

a central diffusion burner (4) comprising a nozzle (6) extending along said axis (2) and defining a first channel (9) radially outwards with respect to said axis (2), conducting an air stream (F1), and housing an ignition device (10); a second channel (11) extending along said axis (2); and a third channel (12) interposed radially between said first and said second channel (9, 11) and separate from said first and said second channel (9, 11); and a peripheral premix burner (5) surrounding said nozzle (6);

the method comprising a first step of starting up said gas turbine, wherein said peripheral premix burner (5) is off; and, once a given power threshold (C) is exceeded, a second step wherein said peripheral premix burner (5) is on;

said first step comprising the operations of igniting a diffusion flame at the start of said first step, and of feeding a fuel gas stream (F2) along said third channel (12);

during said second step a pilot diffusion flame being held by continuing to feed the fuel gas stream (F2) along said third channel (12), and by reducing gas flow of said fuel gas stream (F2) at the start of said second step with respect to gas flow (P1) at said first step and to a value greater than zero (P2);

characterized in that said first step is carried out by the pilot diffusion flame only up until the start of the second step; and in that part of said fuel gas stream (F2) is diverted from said third channel (12) to said ignition device (10) to ignite said pilot diffusion flame at the start of said first step.

2. A method as claimed in claim 1, characterized in that gas flow is reduced at the start of said second step to 5% of the gas flow (P1) at said first step.

3. A gas combustor (1) of a gas turbine; the gas combustor having an axis (2) and comprising:

a central diffusion burner (4) comprising a nozzle (6) extending along said axis (2) and defining a first channel (9) radially outwards with respect to said axis (2), conducting an air stream (F1), and housing an ignition device (10); a second channel (11) extending along said axis (2); and a third channel (12) interposed radially between said first and said second channel (9, 11) and separate from said first and said second channel (9, 11);

a peripheral premix burner (5) surrounding said nozzle (6);

control means (S) for keeping said peripheral premix burner (5) off at a first step wherein said gas turbine is started up, and for activating said peripheral premix burner (5) at a second step, once a given power threshold (C) is exceeded; and feed means for feeding a fuel gas stream (F2) along said third channel (12);

regulating means (S) for regulating said fuel gas stream (F2) to reduce gas flow at the start of said second step with respect to gas flow (P1) at said first step and to a value greater than zero (P2) along said third channel (12);

characterized by comprising only two fuel gas feed lines, one for said premix burner (5) and the other defined by said third channel (12); and by also comprising a through hole (22) formed through an outer lateral wall of said third channel (12) for diverting part of said fuel gas stream (F2) from said third channel (12) to said ignition device (10) for igniting a diffusion pilot flame at the start of said first step.

\* \* \* \* \*